(12) United States Patent
Gustman et al.

(10) Patent No.: US 6,581,071 B1
(45) Date of Patent: *Jun. 17, 2003

(54) SURVEYING SYSTEM AND METHOD

(75) Inventors: Samuel Gustman, Santa Monica, CA (US); Barbara DeLury, Los Angeles, CA (US)

(73) Assignee: Survivors of the Shoah Visual History Foundation, Los Angeles, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 09/659,988

(22) Filed: Sep. 12, 2000

(51) Int. Cl.[7] .................................. G06F 17/20
(52) U.S. Cl. ........................ 707/104.1; 707/10
(58) Field of Search ................ 707/10, 104.1, 707/102, 3, 103

(56) References Cited

U.S. PATENT DOCUMENTS

| | | |
|---|---|---|
| 5,010,500 A | 4/1991 | Makkuni et al. |
| 5,119,474 A | 6/1992 | Beitel et al. |
| 5,121,470 A | 6/1992 | Trautman |
| 5,123,088 A | 6/1992 | Kasahara et al. |
| 5,192,999 A | 3/1993 | Graczyk et al. |
| 5,210,868 A | 5/1993 | Shimada et al. |
| 5,241,671 A | 8/1993 | Reed et al. |
| 5,274,758 A | 12/1993 | Beitel et al. |
| 5,278,946 A | 1/1994 | Shimada et al. |
| 5,280,573 A | 1/1994 | Kuga et al. |
| 5,283,638 A | 2/1994 | Engberg et al. |
| 5,283,819 A | 2/1994 | Glick et al. |
| 5,297,249 A | 3/1994 | Bernstein et al. |
| 5,303,296 A | 4/1994 | Zucker |
| 5,307,456 A | 4/1994 | Macay |
| 5,402,499 A | 3/1995 | Robison et al. |
| 5,404,506 A | 4/1995 | Fujisawa et al. |
| 5,408,665 A | 4/1995 | Oren et al. |
| 5,414,644 A | 5/1995 | Seaman et al. |
| 5,428,730 A | 6/1995 | Baker et al. |
| 5,428,774 A | 6/1995 | Takahashi et al. |
| 5,434,592 A | 7/1995 | Dinwiddle, Jr. et al. |
| 5,436,898 A | 7/1995 | Bowen et al. |
| 5,450,581 A | 9/1995 | Bergen et al. |
| 5,461,611 A | 10/1995 | Drake, Jr. et al. |
| 5,493,677 A | 2/1996 | Balogh et al. |
| 5,515,490 A | 5/1996 | Buchanan et al. |
| 5,530,852 A | 6/1996 | Meske, Jr. et al. |
| 5,608,900 A | 3/1997 | Dockter et al. |
| 5,613,909 A | 3/1997 | Stelovsky |

(List continued on next page.)

OTHER PUBLICATIONS

U.S. patent application Ser. No. 09/792,381, Gustman, filed Feb. 3, 2000.

U.S. patent application Ser. No. 09/788,310, Gustman, filed Feb. 16, 2001.

U.S. patent application Ser. No. 09/659,987, Gustman, filed Sep. 12, 2000.

*Primary Examiner*—Diane D. Mizrahi
(74) *Attorney, Agent, or Firm*—The Hecker Law Group

(57) ABSTRACT

A survey system and method is described wherein multiple instances or versions of a survey may be defined and data from survey instances may be retained in a cohesive data, or knowledge, base. Each survey version may comprise different sets of questions and different types of answers to the questions. The schema and survey instances may be generated in a computer system implementing embodiments of the present invention. One or more graphical user interfaces is generated by computer programs that facilitate the creation of a survey schema and survey instance from the survey schema as well as capture survey responses. Graphical user interfaces (GUIs) may be used to define, or modify, survey instances and survey schema(s) as well as capture survey data. A change to an element of a survey schema is reflected in a survey instance that includes the element.

39 Claims, 15 Drawing Sheets

U.S. PATENT DOCUMENTS

| | | |
|---|---|---|
| 5,615,112 A | 3/1997 | Liu Sheng et al. |
| 5,617,119 A | 4/1997 | Briggs et al. |
| 5,630,121 A | 5/1997 | Braden-Harder et al. |
| 5,630,125 A | 5/1997 | Zellweger |
| 5,649,185 A | 7/1997 | Antonogini et al. |
| 5,649,186 A | 7/1997 | Ferguson |
| 5,682,330 A | 10/1997 | Seaman et al. |
| 5,724,605 A | 3/1998 | Wissner |
| 5,813,014 A * | 9/1998 | Gustman ............... 707/103 |
| 5,832,495 A * | 11/1998 | Gustman ............... 707/102 |
| 5,832,499 A | 11/1998 | Gustman |
| 5,867,709 A | 2/1999 | Lang et al. |
| 6,092,080 A | 7/2000 | Gustman |
| 6,199,060 B1 | 3/2001 | Gustman |
| 6,212,527 B1 | 4/2001 | Gustman |
| 6,353,831 B1 | 3/2002 | Gustman |

* cited by examiner

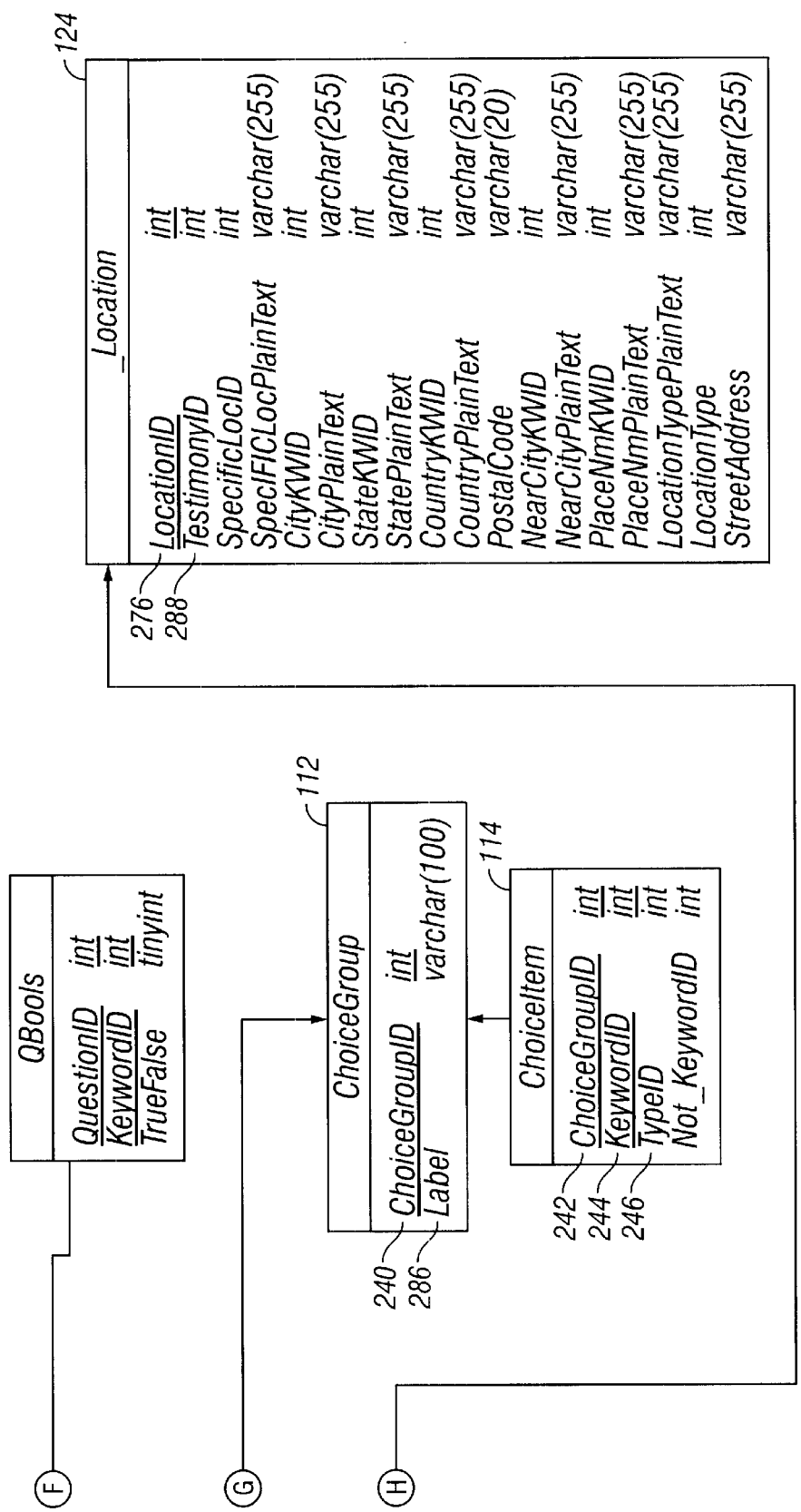

Testimony IntCode : 232
Interviewee : Sigi Hart

Selected Question Group: Attend synagogue or church — 1114

Sections — 1102

[Spreadsheet...] [OK]

[Find] [Reset] [Collapse All...]

Sections list — 1106:
- ▷ 1. PIQ Entry Details
- ▷ 2. Front Page
- ▷ 3. General Interview Details
- ▷ 4. Interviewee Information
- ▽ 5. Prewar Life — 1108
  - Prewar Addresses
  - Household members (extended family & other — 1110
  - Organizational Affiliation
  - Activities & Interests
  - *Attend synagogue or church* — 1112
- ▷ 6. Wartime
- ▷ 7. Postwar
- ▷ 8. Family / People in This Testimony
- ▷ 9. Family Identity
- ▷ 10. Post-Interviewer Information
- ▷ 11. Interviewer Iinformation
- ▷ 12. Notes
- ▷ 13. Rescue and Aid Insert (name)
- ▷ 14. War Crime Trials
- ▷ 15. Liberation Insert Section
- ▷ xxx Non-Catalogueable PIQ Questions

| Question — 1116 | Answer 1 — 1118 |
|---|---|
| Did your family attend a synagogue or church prior to the war? (Yes, No) | Yes — 1130A |
| If so, how often? (Plain Text) | Friday and Saturday every week — 1130B |
| Name and Location of synagogue, church, etc. (PIQLocation) | Place Nm: Heidereyter Shul / Berlin (Germany) / Germany / Heidereyter Gasse — 1130C |
| Name of synagogue or church leader? (PIQPerson) | — 1130D |

Keyword Answer — 1120

Plain Text Answer — 1124

Keywords — 1104

[Find] [Reset]

| PIQ Persons | Prop KWs — 1128 |
|---|---|
| Type | |
| PIQPerson | friends         Simon , |
| PIQPerson | friends         [Diamond] , , Mr. |
| PIQPerson | sisters-in-law  Vogel] , Michelle , |
| PIQPerson | aunts           [Wulkanj , Freidel , |
| PIQPerson | grandfathers    Begleiter , , |
| PIQPerson | grandmothers    Begleiter , , |
| PIQPerson | aunts           Begleiter , Adela , |
| PIQPerson | uncles          Begleiter , Baruch , |
| PIQPerson | uncles          Begleiter , Isak , |

— 1126

PIQ Choices — 1122

Keyword

1

SURVEYING SYSTEM AND METHOD

BACKGROUND OF THE INVENTION

1. Field of the Invention

This invention relates to the collection and entering of data associated with a survey or other data collection mechanism using a computer system.

2. Background Art

Data is sought and collected from different sources and used to, for example, assist in making economic, marketing, etc. decisions. The collected data may be used to supplement historical information with personal experiences and to identify behavioral patterns. For example, the United States government collects census data from households that may be used by governmental entities and community organizations to allocate funds, develop social programs as well as by the business sector to locate factories, shopping centers, etc. Surveys may also be conducted by businesses to determine consumers' attitudes and behavior to assist in the research, development and marketing of products.

In a survey, data collection is typically conducted by posing a set of questions to a set of participants in person, over the phone or in writing, for example. The answers are typically recorded in written form and processed or analyzed in some manner. A survey designer typically designs the survey by first identifying the questions that are to be included in the survey and then the expected answers to the questions (e.g., free form text or a multiple choice selection). A standardized survey is printed that contains those questions previously determined by the designer. There is no convenient mechanism available to dynamically alter a survey, or create different versions of a survey.

It may be necessary to modify a survey, for example, to change an answer type for a question, insert or modify one or more questions, etc. Further, it may be desirable to use different versions of a survey for different groups or types of participants. For example, it may be desirable to use a portion of a standardized survey in combination with a customized survey directed to a specific type of participant. A different set of questions may be needed depending on, for example, a participant's religion, education, etc. However, with the current approach to creating a survey, it is not possible to easily modify or customize a survey form for various participants to, for example, include different questions and type of answers, or to capture the data associated with the customized forms. There are currently no computerized survey systems that are able to accommodate different forms of a survey or different answer sets associated with the each survey form.

SUMMARY OF THE INVENTION

A survey system and method is described wherein multiple instances or versions of a survey may be defined and data from survey instances may be retained in a cohesive data, or knowledge, base. Each survey version may comprise different sets of questions and different types of answers to the questions.

A survey schema comprises survey elements that may be used to build different forms or versions of a survey (a survey instance). Examples of elements of a survey schema used in embodiments of the invention include: section, question group, question, answer, data object, insert, choice group, choice item, for example. A section may be used to group question groups, inserts and sections. An insert may be used to capture repeatable data. A question group may be used to group questions. An answer is associated with each question and may also be associated with an insert. Any combination of questions may be used with any combination of data types for answers to the questions.

According to one or more embodiments of the invention, an answer value may be stored as an attribute of an answer element or as attribute (or attributes) of another element associated with an answer element (e.g., a data object or answertext element). Examples of answer and data object types include text, boolean, date, location, movement, person and keyword. New answer types and data objects may be dynamically added to the survey schema. For example, currency and health types may be added to capture currency and health answers.

A survey instance may comprise, for example, some number of sections each of which may comprise some number of sections (or subsections), inserts and question groups. A question group may comprise questions. An existing survey instance may be dynamically modified by adding, deleting or modifying survey elements.

Elements may be reused to facilitate retrieval of information. For example, multiple instances of question in a reusable question group may be created with the same identifier. None or more instances of answer 110 may be related to a given one of the instances of question 108. All instances of an answer that are related to instances of a question may be retrieved using a single identifier value.

In one or more embodiments of the invention, a schema is used to create multiple survey instances. The schema and survey instances may be generated in a computer system implementing embodiments of the present invention. In one or more embodiments of the invention, a survey schema may be defined comprising one or more survey elements that may be used to define survey instances and capture survey data. Relationships between elements of a survey schema may be added, deleted or modified.

An answer type and/or data object may be added to, or modified in, a survey schema. For example, currency and health types may be added to capture currency and health answers. Question and answer elements include an attribute that identifies the answer type associated with each. In an embodiment of the invention, an answer type associated with question or answer may be changed by modifying an attribute of question or answer, respectively. Similarly, a data object that is associated with a question or answer element may be changed by modifying attribute values.

One or more graphical user interfaces is generated by computer programs that facilitate the creation of a survey schema and survey instance from the survey schema as well as capture survey responses. Graphical user interfaces (GUIs) are provided to define, or modify, survey instances and survey schema(s) as well as capture survey data.

A change to an element of a survey schema is reflected in a survey instance that includes the element. For example, if a question element is modified in a survey schema (e.g., the text of a question or the type of answer is changed), the modification is reflected in the survey instances that include that instance of the question element. The propagation of a modification made to a survey schema to a survey instance may be avoided by, for example, making modifications to an element (new or existing) that is not included in the survey instance. A new element may be with or without the use of an existing element in survey schema as a template.

Data may be captured for a survey instance using elements of a survey schema. For example, data may be captured using instances of answer, answertext, insert and data object. An instance of answer may be created to store an answer to an instance of question. In one or more embodiments of the invention, answer text may be stored in answer and/or answertext. A data object may be created to store all or a portion of an answer. If, for example, the answer is of type person, a person data object instance is created and its attributes are populated with the person's information. In one or more embodiments of the invention, a relationship is created between an answer instance and the person data object instance.

In one or more embodiments of the invention, one data object may be related to another data object as part of an answer or otherwise. For example, an alias data object may be related to a person data object to store alias information (e.g., a nickname or other name) associated with a person.

Insert may be used to group answers to questions. For example, a participant may provide more than one set of answers to questions. Each set of answers may be associated with an instance of insert, for example.

BRIEF DESCRIPTION OF THE DRAWINGS

FIG. 5 provides an example of a display that is used to edit an instance of question according to an embodiment of the invention.

FIGS. 7, 8 and 9 provide examples of a graphical user interface for entering object information such as person, alias and location objects according to an embodiment of the invention.

FIG. 11 provides an example of a graphical user interface illustrating a portion of a survey instance that may be used to capture data according to an embodiment of the invention.

DETAILED DESCRIPTION OF THE INVENTION

Figure 1A:
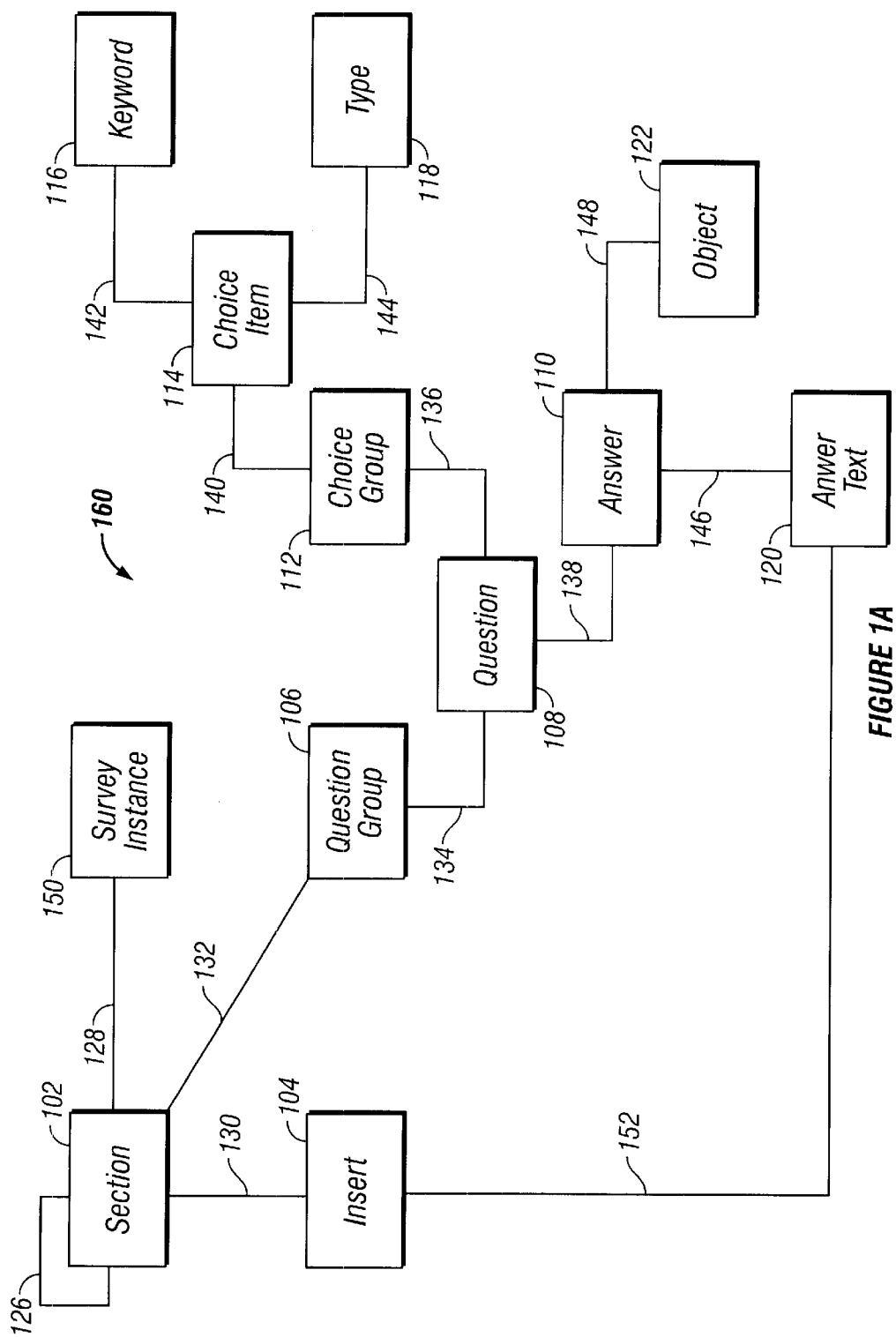
FIG. 1A illustrates a schema comprising survey elements according to an embodiment of the invention.

A survey system and method is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

A survey system and method is described wherein more than one instance or version of a survey may be defined and used for collecting and entering data in a computer system. Using one or more embodiments of the invention, multiple versions of a survey may be defined and entry of data may be collected from the different survey versions into a cohesive data, or knowledge, base or other storage mechanism. Each survey version may comprise different sets of questions and different types of answers to the questions. In an embodiment of the invention, at least one relational database may be used to store survey schema, survey instances and participant data. However, it should be apparent that other storage mechanisms (e.g., file system) may be used. Data may be collected and retained in a cohesive store for each participant regardless of the survey form or instance used.

A survey schema comprises survey elements that may be used to build different forms or versions of a survey (a survey instance). Examples of elements of a survey schema used in embodiments of the invention include: section, question group, question, answer, data object, insert, choice group, choice item, for example. A survey instance may be defined using elements of a survey schema. For example, a survey instance may comprise some number of sections each of which may comprise some number of sections (or subsections), inserts and question groups. A question group may comprise questions. An answer is associated with each question and may also be associated with an insert. Any combination of questions may be used with any combination of data types for answers to the questions. An existing survey instance may be dynamically modified by adding, deleting or modifying survey elements.

In one or more embodiments of the invention, the schema includes a question element that is used to define survey questions. Questions may be grouped using a question group element. Questions and answer types may be dynamically added to the survey schema and added to a survey instance created using the survey schema. An association is created between a question and an answer via the question and answer elements.

According to one or more embodiments of the invention, a survey schema includes an answer element that identifies a data type that may be a simple or complex data type. A simple data type typically involves a single value while a complex data type may involve multiple values. In one or more embodiments of the invention, simple data is stored in an attribute of an instance of answer or another element associated with the answer instance (e.g., answertext). Complex data is stored in more than one attribute such as in attributes of a data object that is related (directly or indirectly) to an answer element. Thus, an answer value may be stored as an attribute of an answer element or as attribute (or attributes) of another element associated with an answer element (e.g., a data object or answertext element). Examples of answer and data object types include date, location, movement, person and keyword. New answer and data object types and data objects may be dynamically added to the survey schema.

A special type of survey element referred to as an insert may be repeated none or more times in a survey. An insert may be used, for example, to accommodate repeatable survey information. For example, a survey may include questions requesting a person's educational background (e.g., undergraduate and graduate collegial background). An insert may be used to capture each collegial experience, for example.

Question group elements are reusable in a survey such that more than one instance of a question in a question group may share the same identifier. Thus, it is possible to correlate answers to question instances using the same identifier.

Survey Schema

According to one or more embodiments of the invention, a schema is defined that identifies a generic survey structure and includes survey elements that may be used to create survey instances and capture data collected for each survey instance. FIG. 1A illustrates a schema comprising survey elements according to an embodiment of the invention.

In one or more embodiments of the invention, a survey instance (or survey form) 150, created using a schema such as survey schema 160, comprises one or more instances of section 102. Section 102 may include a number of instances of section 102 (or subsections), insert 104 or question group 106. Insert 104 represents an element that may be repeated in survey instance 150. Insert 104 may be used to dynamically add components to a survey instance 150 to capture repeatable data which may occur when there can be multiple answers to a question or questions, for example. A section may contain questions requesting information regarding the automobiles that a participant's has purchased. An insert may be used to group answers associated with each of the automobiles.

A subsection is an instance of section 102 that is contained within another instance of section 102. In one or more embodiments of the invention, there may be a hierarchy of instances of section 102 defined in survey schema 160 and/or used in a survey instance 150.

An instance of section 102 is related to another instance of section 102 via relationship 126 such that an instance of section 102 may contain (or be contained in) multiple instances of section 102. Insert 104 is related to section 102 via relationship 130 such that multiple instances of insert 104 may be associated with section 102. Section 102 may contain none or more instances of insert 104. Section 102 may be associated with, and contain, none or more instances of question group 106 as is illustrated by relationship 132.

Question group 106 may be used to group a number of instances of question 108. Question group 106 may contain more than one question 108. Question 108 may be included in more than one question group 106.

In one or more embodiments of the invention, a set of selection items (each identifying a valid answer selection) may be associated with a question. A selection is identified by a choice item 114. Choice group 112 is used to group a number of instances of choice item 114 to an instance of question 108. Where a choice group 112 is associated with question 108, a value of answer 110 may be identified by selecting one of a number of choices identified by instances of choice item 114 comprising choice group 112.

In one or more embodiments of the invention, choice item 114 may be one selection item, or value. For example, an instance of choice item 114 may specify an instance of keyword 110 (i.e., an attribute value associated with keyword 110). Alternatively, choice item 114 may identify a class that comprises a plurality of selection items. For example, choice item 114 may identify an instance of type 118, where type 118 represents a class of selection items (e.g., a class of keywords). A class of selection items comprises selection items (e.g., instances of keyword 116) that are of type 118. Thus, choice group 112 may comprise instances of choice item 114 which may be a combination of none or more individual selection items and none or more classes of selection items.

An answer may be a simple or complex answer. A simple data type typically involves a single value while a complex data type may involve multiple values. In one or more embodiments of the invention, simple data is stored in an attribute of an instance of answer or another element associated with the answer instance (e.g., answertext). Complex data is stored in more than one attribute such as in attributes of a data object that is related (directly or indirectly) to an answer element.

In one or more embodiments of the invention, an answer to an instance of question 108 may be stored in answer 110, answerText 120 and/or data object 122. A single-value answer may be stored in an attribute of answer 110 (e.g., a value stored in attribute 266, "answertext" of FIG. 2). None or more instances of answertext 120 may be used to store additional answer text of a question 108. In an embodiment of the invention, a survey element referred to as data object 122 may be used to store a multi-value answer. In an embodiment of the invention, multiple instances of data object 122 may be used to store a multi-value answer to question 108. An attribute of one data object 122 may be stored as attributes of data object 122. Thus, an instance of data object 122 may be associated with another instance of data object 122 and answer 110, for example.

In an embodiment of the invention, data object 122 includes, but is not limited to, person, alias, date, movements and location objects each of which comprise a set of attributes that may be used to store values of a multi-value answer. A person data object may have first name, middle name, last name, date of birth, gender, type, title, etc. attributes, for example. Embodiments of the invention may include additional or different data objects 122 or have additional or different attributes.

Survey schema 160 is used to create none or more survey instances 150. Survey instance 150 may be in a print, electronic or other form, for example. In one or more embodiments of the invention, survey instance 150 may be displayed in a graphical user interface (GUI) which may be used to capture survey data. The GUI may be used by a survey participant to enter answers, or by another party who enters a participant's answers recorded on a hardcopy of a survey instance 150, for example.

In one or more embodiments of the invention, a survey instance 150 that is displayed in a GUI or otherwise may comprise some number (i.e., none or more) of instances of elements of survey schema 160. FIG. 1C provides an example of structure of a survey instance according to an embodiment of the invention. Survey instance 150 comprises some number of section 102, question group 106, question 108, choice group 112, choice item 114, etc. Question 108 identifies an answer 110 that is to be used in capturing an answer (or answers) to the question. Answer 110 may identify a data object, or other schema element, that may be used in storing answer values. Instances of answer 110, answer text 120 and object 122 may be added to a survey instance 150 to store answers to a question 108. Insert 104 may be associated with instances of section 102 and instances of insert 104 may be dynamically added during data capture to capture repeatable data, and answer 110 may be associated with an insert 104.

Survey schema 160 may be used to create any number of survey instance 150 each of which may vary in their structure including but not limited to section 102, question group 106, question 108, answer 110 and/or the types of answers that are expected for each question. Answers associated with each of survey instance 150 may be captured into a cohesive data store (e.g., a relational database or databases).

Survey Schema Element Attributes

Figure 2A:
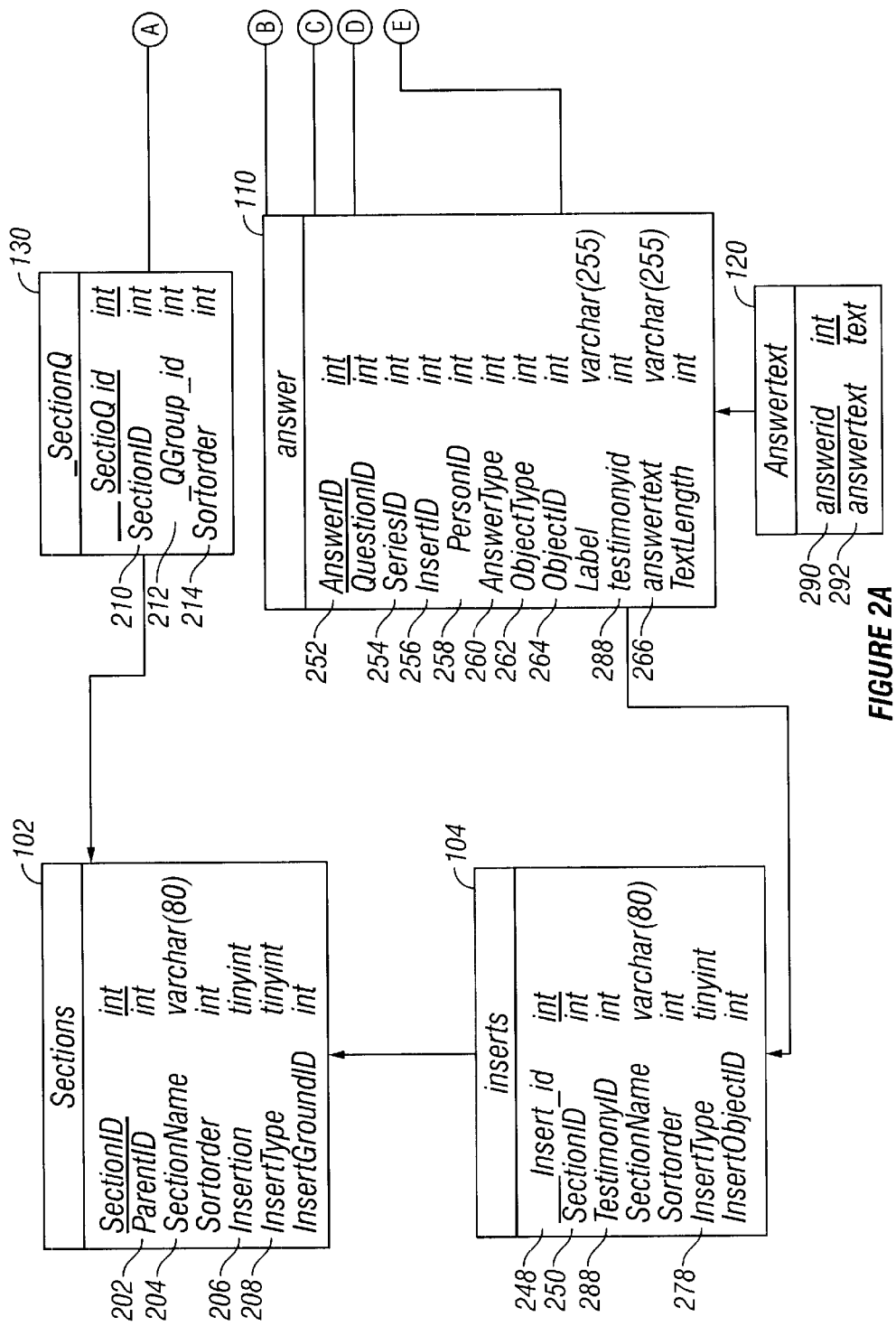
FIG. 2 illustrates elements of the survey schema of FIG. 1A and attributes associated with survey elements according to one or more embodiments of the invention.
Figure 2B:
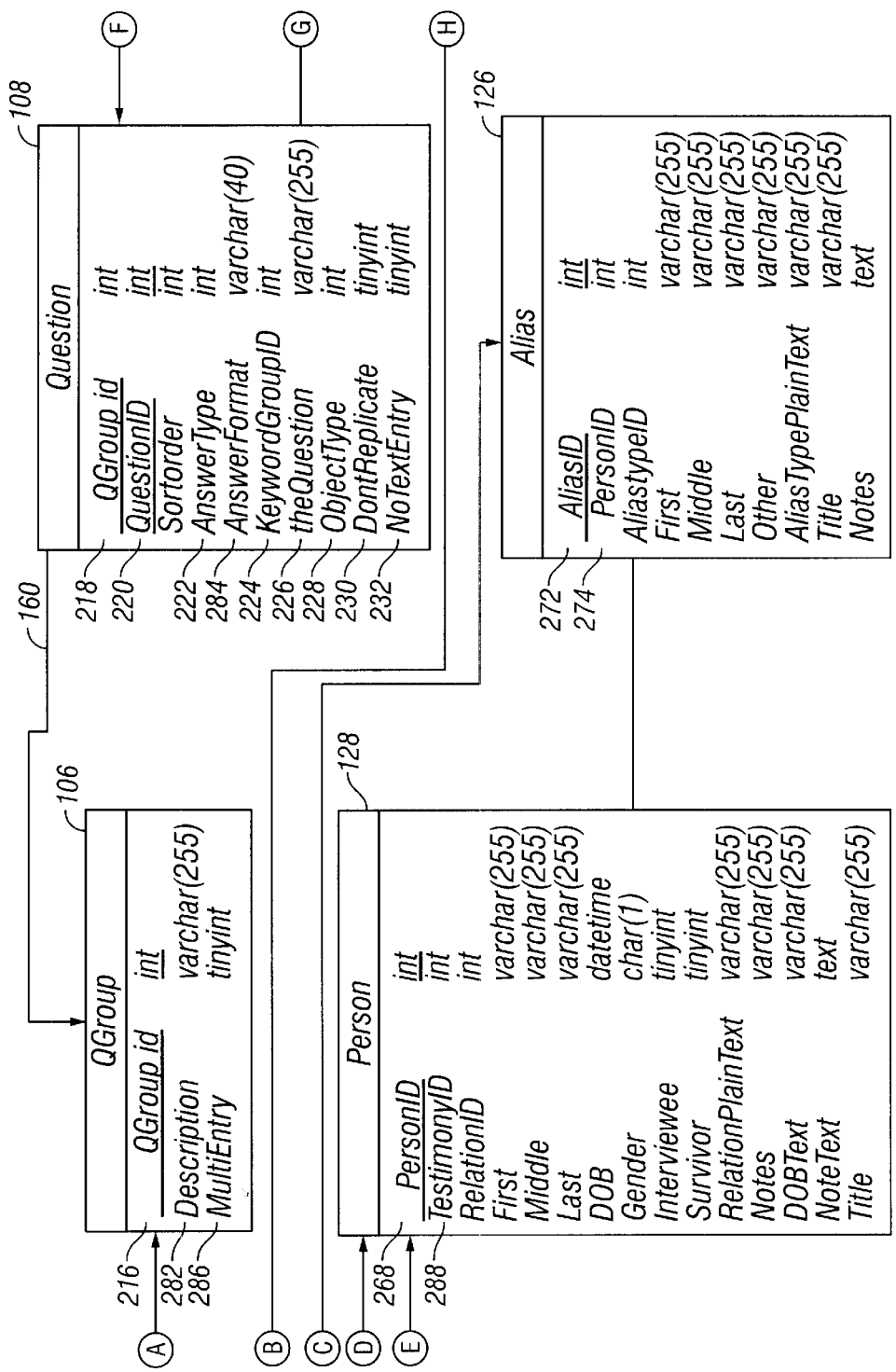

In one or more embodiments of the invention, attributes of elements of survey schema 160 comprise attributes that may be used to store information concerning components of a survey instance 150 and data collected for a survey instance 150 (e.g., participant data). FIG. 2 illustrates elements of survey schema 160 of FIG. 1A and attributes associated with survey elements according to one or more embodiments of the invention.

Section 102 includes a section identifier attribute 202 ("SectionID") that uniquely identifies each instance of section 102. A parent identifier attribute 204 ("ParentID") identifies a subsection's parent instance of section 102. Attributes 206 and 208 indicate whether an instance of section 102 may have inserts (e.g., instances of insert 104) and the type of insert(s), respectively. Section name attribute 280 ("SectionName") comprises a name or title of an instance of section 102.

In one or more embodiments of the invention, element 130 of survey schema 160 is used to relate section 102 and question group 106 in a many-to-many relationship. That is, section 102 may include none or more instances of question group 106, and none or more instances of section 102 may contain the same instance of question group 106. Instances of element 130 may be identified using attribute 210 ("SectionQ_id"). Attributes 212 and 214 relate an instance of section 102 using its identifier (section identifier 150) and an instance of question group 106 using its identifier (question group identifier 216, "QGroup_id"), respectively.

Question 108 includes a question identifier 220 ("QuestionID") to identify each instance. Attribute 218 associates an instance of question 108 with an instance of question group 106. Answer type attribute 222 identifies an answer type for question 108. Where the type of answer is a complex data object, attribute 228 identifies the type of data object (e.g., person 128, location 124 and alias 126). Attribute 226 contains the text of the question. Attribute 230 identifies whether an answer 110 associated with an instance of question 108 is repeatable.

Choice group 112 includes a choice group identifier 240 ("ChoiceGroupID") that identifies an instance. Choice group identifier 240 is used in choice item 114 (attribute 242) to associate an instance of choice group 112 with an instance of choice item 114. Attributes 244 and 246 of choice item 114 to identify one selection item or a class of selection items, respectively.

Insert 104 includes an identifier attribute 248 ("Insert_id") that identifies an instance. Insert 104 is used to identify a repeatable data in a survey instance 150. Attribute 250 ("SectionID") associates an instance of insert 104 to an instance of section 102. Attribute 278 ("InsertType") identifies a type of insert.

An instance of answer 110 may be identified using attribute 252 ("AnswerID"). Attribute 254 ("QuestionID") associates an instance of answer 110 and an instance of question 108. An instance of answer 110 may be associated with an instance of insert 104 via attribute 256 ("InsertID"). A value that is an answer to a question may be stored in attribute 266 ("answertext"). Additional answer values may be stored in attribute 292 ("answertext") of element 120 which may be associated with answer 110 using attribute 290. Alternatively, a data object may be used to store a multi-value answer. Attributes 262 and 264 may be used to associate an answer 110 with a data object 122. Attribute 260 ("AnswerType") specifies the type of answer. Examples of answer types include boolean, plain text, object (e.g., data object) and single select. Person 128, alias 126 and location 124 are examples of data object 122. Person 128 includes attributes associated with a person (e.g., name, gender, date of birth, etc.) Attribute 268 ("PersonID") is used to identify an instance of person 128. A new answer type may be added by specifying a new value for attribute 260 associated with the new answer, or data, type.

Another example of data object 122, alias 126 may be used to store another identity associated with, for example, a person. Attribute 272 ("AliasID") is used to identify an instance of alias 126. Attribute 274 relates an instance of person 128 and alias 126. Location 124 includes attributes for storing location information (e.g., city, state, country, street address, etc.). Attribute 276 is used to identify an instance of location 124.

In one embodiment of the invention, for example, multiple instances of question 108 may be created with the same identifier. None or more instances of answer 110 relate to one instance of question 108. Alternatively, more than one instance of question 108 having the same identifier may be associated with none or more instances of answer 110. That is, a survey element such as question 108 may be reused such that multiple instances of question 108 are given the same identifier. Thus, the same identifier may be used to identify one or more instances of the element thus facilitating a query for information associated with the reusable element.

For example, all instances of answer 110 related to an instance (or instances) of question 108 may be retrieved by querying for one value of attribute 220 (i.e., "QuestionID"). Question group 106 further includes attribute 286 which indicates whether question group 106 is reusable. In a reusable question group 106, instances of the same question 108 are given the same identifier across instances of question group 106.

Figure 1B:
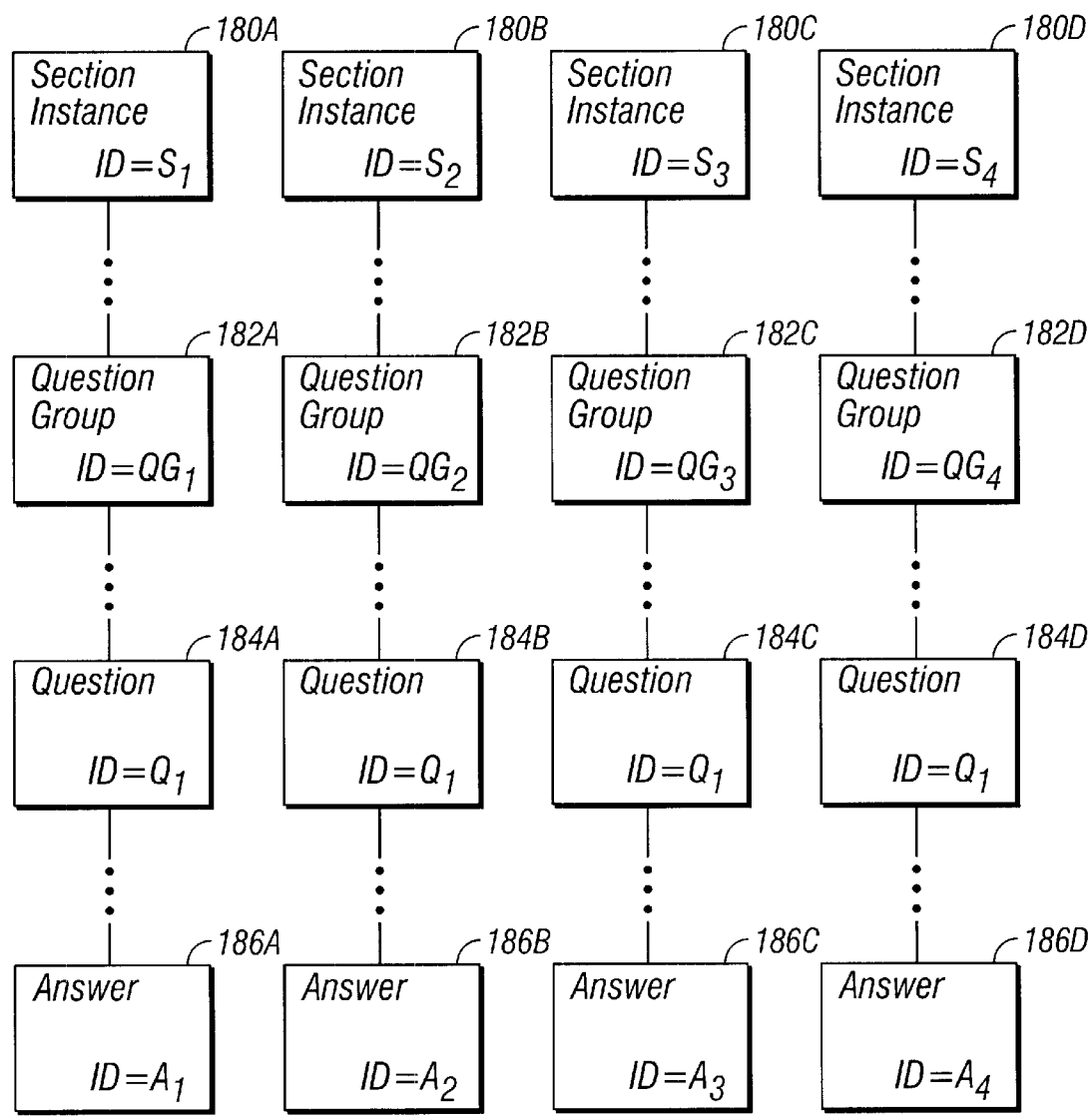
FIG. 1B provides an example of reusable survey elements according to an embodiment of the invention.
Figure 1C:
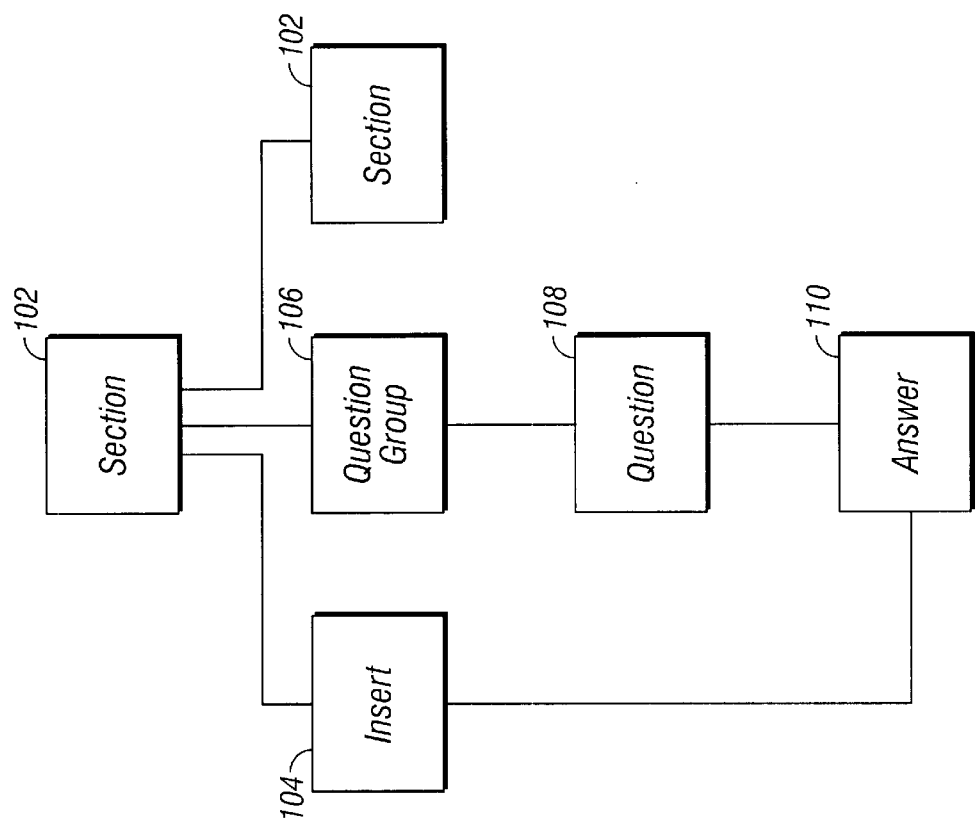
FIG. 1C provides an example of a structure of a survey instance according to an embodiment of the invention.

FIG. 1B provides an example of a question 108 in a reusable question group 106 according to an embodiment of the invention. Section instances 180A–180D are generated using section 102 of survey schema 160. In each of section instances 180A–180D, Attribute 202 is populated with a value that may be used to identify the instance. For example, section instances 180A–180D have identifiers of "$S_1$," "$S_2$," "$S_3$," and "$S_4$," respectively. Section instances 180A–180D may be included in the same or a different survey instance 150.

In this example, each of section instances 180A–180D is associated with an instance of question group (i.e., question groups 182A–182D, respectively). Attribute 216 of question group 106 is assigned an identifier value in each of question groups 182A–182D. In the example of FIG. 1B, identifier values for question groups 182A–182D are "$QC_1$," "$QC_2$," "$QC_3$" and "$QC_4$," respectively. A different value is used to uniquely identify each instance.

Question groups 182A–182D are reusable such that questions 184A–184D within each have the same identifier. As a member of a reusable component of a survey, questions 184A–184D have the same identifier (i.e., "Q1").

Answers 186A–186D are instances of answer 110 that represent answers to questions 184A–184D, respectively. An identifier is assigned to each of answers 186A–186D (i.e., "$A_1$," "$A_2$," "$A_3$" and "$A_4$").

It is possible to retrieve answers associated with questions 184A–184D using the same identifier. That is, it is possible to find all answers to a question whose identifier is equal to "$Q_1$." If each of questions 184A–184D had different identifiers, it would be necessary to identify the value of each identifier prior to retrieving the answers associated with each question.

In one or more embodiments, answer 110 may be be repeatable. Attribute 230 of question 108 identifies an answer as being repeatable.

Process Overview

Figure 10:
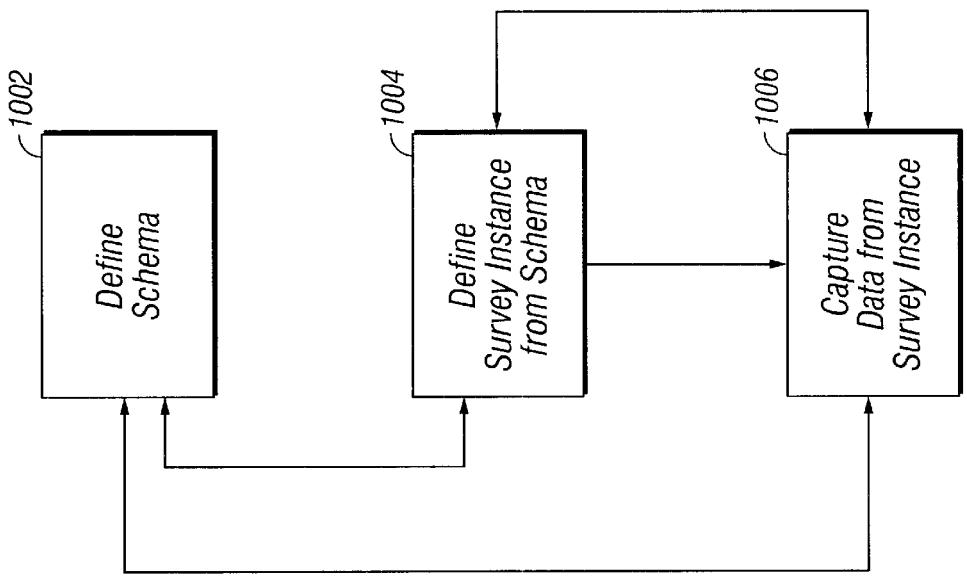
FIG. 10 illustrates a survey definition and generation process flow according to one or more embodiments of the invention.

In one or more embodiments of the invention, schema 160 is used to create multiple survey instances 150. FIG. 10 illustrates a survey definition and generation process flow according to one or more embodiments of the invention.

At block 1002, survey schema 160 is defined. For example, elements of survey schema 160 may be added, deleted or modified. Instances of section 102, question group 106, question 108, answer 110, data object 122, and choice group 112 may be added, deleted or modified, for example. Relationships between elements of survey schema 160 may be added, deleted or modified. For example, an instance of question 108 may be added to or removed from a question group 106. Similarly, a question group 106 may be added to or removed from a section 102. An insert 104 may be added to or removed from a section 102. A choice item 114 may be added to or removed from a choice group 112, and a choice group 112 may be added to or removed from a question 108.

In one or more embodiments of the invention, a new answer type may be added to schema 160. Each answer type has an associated value (e.g., a numeric value). Question 108 and answer 110 include an attribute (e.g., "Answertype," attributes 222 and 260, respectively) that identify the answer type associated with each. In an embodiment of the invention, an answer type associated with question 108 or answer 110 may be changed by modifying an attribute of question 108 or answer 110. Similarly, a data object 122 (e.g., person 128, alias 126 and location 124) that is associated with question 108 or answer 110 may be changed by modifying attribute values (e.g., attributes 228 and 262, respectively).

At block 1004, a survey instance 150 may be defined using a survey schema 160 defined in block 1004. A survey instance 150 may comprise none or more instances of section 102, question group 106, question 108, choice group 112, insert 104, answer 110, choice item 114, etc. It is possible, in one or more embodiments of the invention, to define survey schema 160 and survey instance 150 simultaneously. For example, it is possible to define an element of schema 160 (e.g., using step 1102) for use in a survey instance 150 at step 1004. A survey designer may make use of the elements of survey schema 160 to define a survey instance 150 as well as define additional elements of survey schema 160.

In one or more embodiments of the invention, a change to an element of survey schema 160 is reflected in a survey instance 150 that includes the element. For example, if an instance of question 108 is modified in survey schema 160 (e.g., the text of an instance of question 108 or the answer is changed), the modification is reflected in a survey instance 150 that includes that instance of question 108. The propagation of a modification in survey schema 160 to a survey instance 150 may be avoided, for example, making modifications to an element (new or existing) that is not included in the survey instance 150. A new element may be created with or without the use of an existing element (or elements) as a template.

At block 1006, data may be captured in elements of survey schema 160 for a survey instance 150. For example, data is captured using instances of answer 110, answertext 120, insert 104 and data object 122. In one or more embodiments of the invention, answer text may be stored in attribute 266 of answer 110 and/or attribute 292 of answertext 120. An association between answer 110 and answertext 120 may be formed by storing an identifier of answer 110 in attribute 290 of answer 120.

In one or more embodiments of the invention, a data object 122 may be used to store all or a portion of an answer. If, for example, the answer is of type person, a person 128 instance may be created and the attributes are populated with the person's information. In one or more embodiments of the invention, a relationship is created between an answer 110 and the person 128 instance by storing the identifier of the person 128 instance in attribute 264 of answer 110.

In one or more embodiments of the invention, one data object 122 may be related to another data object 122 as part of an answer. For example, alias 126 may be related to person 128 and store alias information (e.g., a nickname or other name) associated with a person.

Insert 104 may be used to group answers to questions. For example, a participant may provide more than one set of answers to questions in an instance of section 102. Each set of answers may be associated with an instance of insert 104.

Survey Example

In one or more embodiments of the invention, a graphical user interface is used to define schema 160, define survey instance 150 and capture data from a survey instance 150 (e.g., to perform steps 1002, 1004 and 1006 of FIG. 10).

Survey Data Capture GUI

FIG. 11 provides an example of a GUI illustrating a portion of a survey instance 150 that may be used to capture data according to an embodiment of the invention. It should be apparent that embodiments of the invention are not limited to the survey example of FIG. 11.

In the example of FIG. 11, window 1102 depicts a portion of a survey instance 150 used to capture holocaust survivor information. Each survivor (i.e., survey participant) is asked for biographical information including general information in addition to prewar, wartime and post-wartime experiences. Data may be entered using window 1102 from a printed version of a survey instance 150, or directly by a participant, for example. Area 1104 provides a list of sections 102 of the survey instance 150. According to one or more embodiments of the invention, a user enters survey data by selecting, or opening, sections (e.g., sections 1106 and 1108) in area 1104.

Section 1108 is opened which indicates that it has been selected while sections 1106 are closed or collapsed in this example. In one or more embodiments of the invention, display 1110 identifies instances of question group 106 of an open instance of section 102 (e.g., section 1108) is displayed. An instance of question group 106 in display 1110 may be selected such as question group selection 1112 which is shaded to indicate that it has been selected. Instances of question 108 that are associated with question group selection 1112 are displayed in area 1114 of window 1102.

Area 1114 comprises columns 1116, 1118 and 1120. In this embodiment of the invention, answer type may also be displayed as a further prompt to the user. For example, entry 1130A indicates that the answer that is expected is a boolean answer (e.g., "yes" or "no"). Entry 1130B indicates that a plain text answer is expected for the question. Entries 1130C and 1130D indicate that instances of data object 122 (i.e., location 124 and person 128) are the expected type for these questions.

Answer text is displayed in columns 1118 and 1120. Instances of choice item 114 may be displayed in area 1122.

Thus, for example, when an instance of question 108 displayed in column 1116 is selected, instances of choice item 114 that are associated with the selected instance of question 108 are displayed in area 1122.

Area 1124 may be used to display possible answer selections associated with a question that is displayed in area 1114. For example, entry 1130D expects an instance of person 128 as an answer. Column 1126 may be used to display existing instances of person 128 that may be selected as an answer. Column 1128 of area 1124 may also be used to enter a proposed answer to a question. The proposed answer is retained, subsequently reviewed, and either accepted or rejected. If accepted, the proposed answer becomes an answer to the question and may become a selectable answer to another question. If rejected, a proposed answer is removed, and another answer may be provided.

Survey Definition GUI

Figure 3:
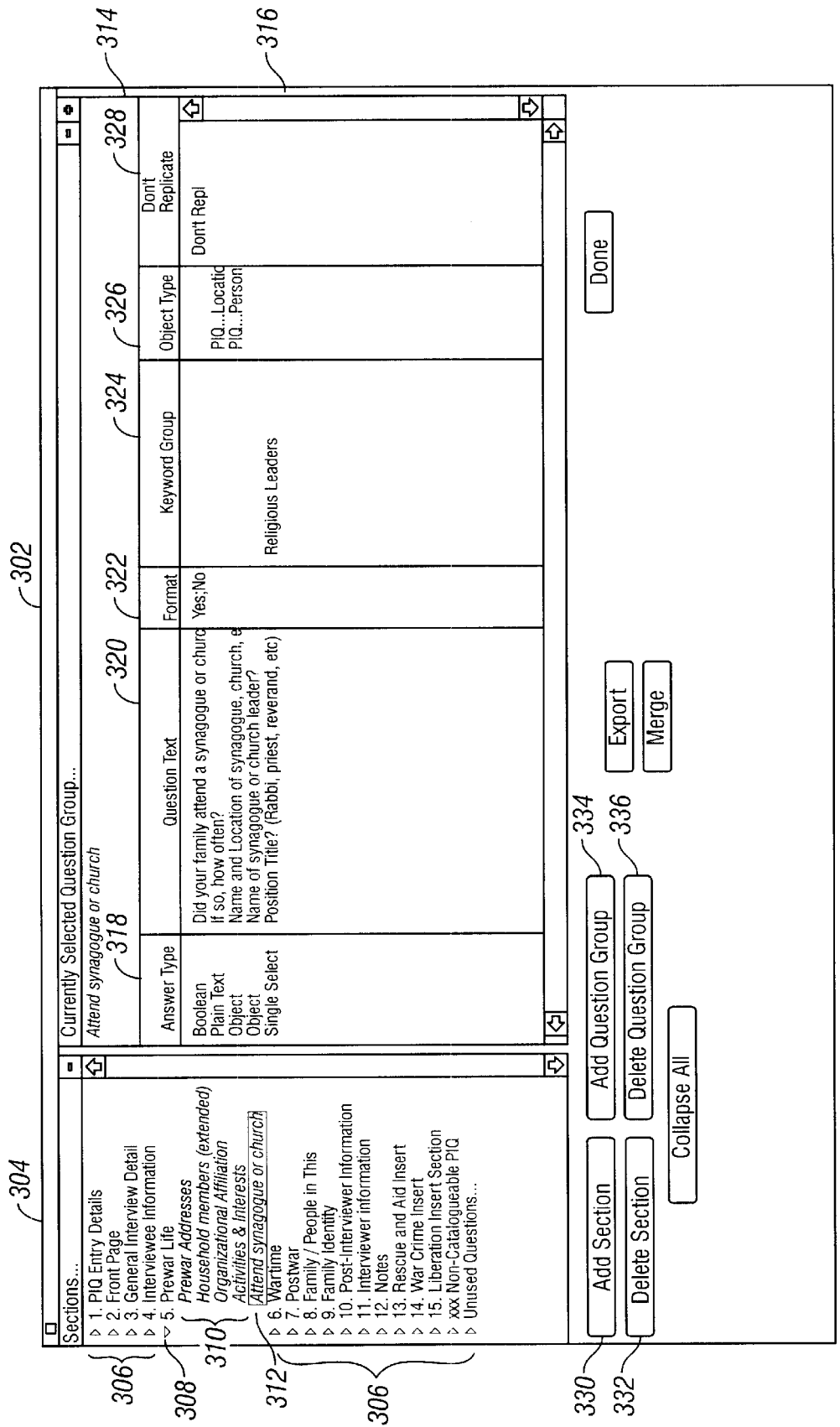
FIG. 3 illustrates an example of a window in a graphical user interface used to modify instances of section that comprise a survey instance according to an embodiment of the invention.

FIG. 3 illustrates an example of a window in a GUI used to modify instances of section 102 that comprise a survey instance 150 according to an embodiment of the invention. In display 302, a window is shown which is comprised of instances of section 102, question group 106 and question 108.

Panel 304 displays instances of section 102 (sections 306 and 308) within an instance of form 150. Sections 306 are collapsed such that instances of question group 106 are not displayed. Section 308 is expanded to display instances of question group 106 within section 308 (e.g., question groups 310 and 312). Question group 312 is selected in panel 304 such that instances of question 108 are displayed in panel 316 and the name (i.e., section name attribute 280) is displayed in panel 314.

Panel 316 displays attribute values associated with instances of question 108. Column 320 of panel 316 identifies the question text (i.e., attribute 226) of five instances associated with question 108. Column 318 of panel 316 identifies answer types (e.g., retained in attribute 222) associated with each question. Columns 322, 326 and 328 display values for attributes 284, 228 and 230 of question 108, respectively. Column 324 displays the name of an instance of choice group 112 that groups choices, or answer selections, for a question.

Figure 4A:
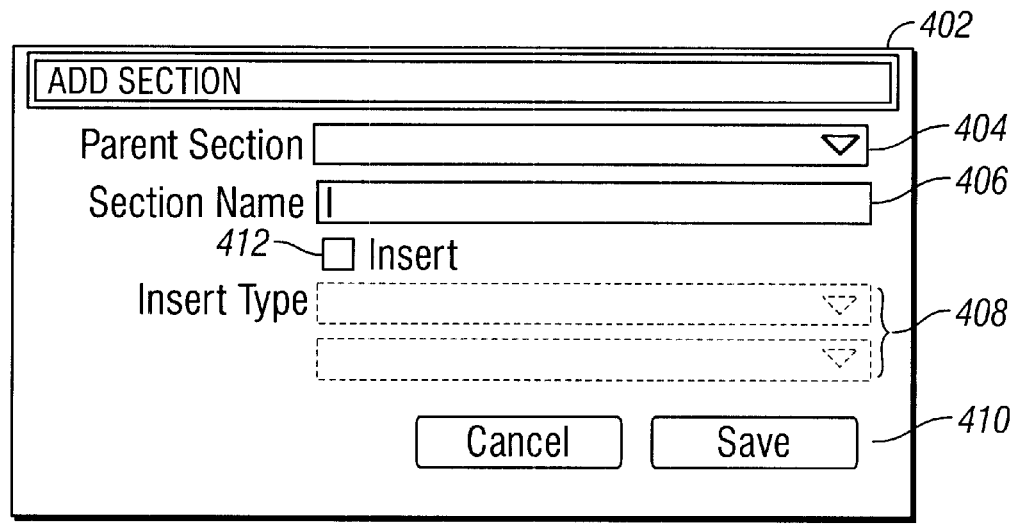
FIGS. 4A–4B illustrate add section and question panels according to an embodiment of the invention.
Figure 4B:
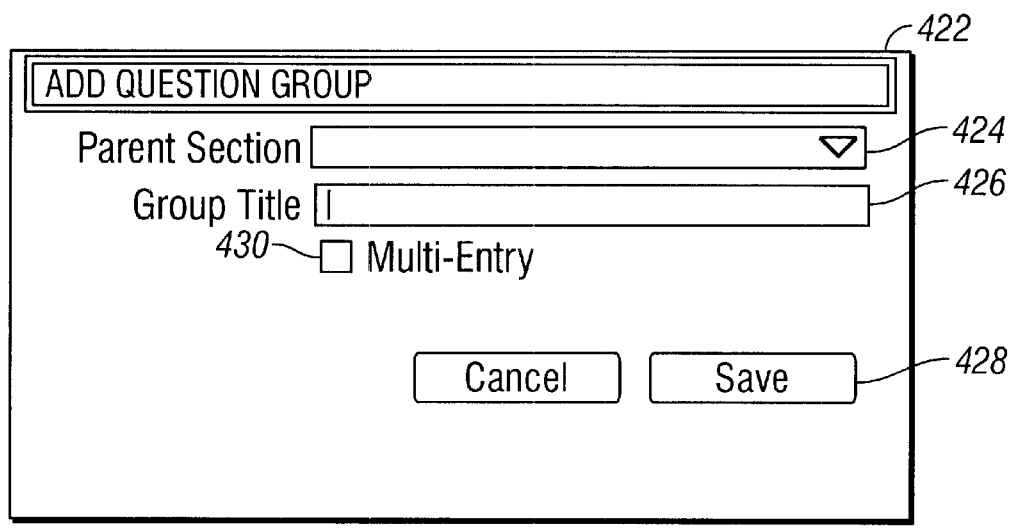

Using buttons 330, 332, 334 and 336, a survey developer may add a section, delete a section, add a question, delete a question respectively. FIGS. 4A–4B illustrate add section and question panels according to an embodiment of the invention.

Referring to FIG. 4A, panel 402 may be used, in one or more embodiments of the invention, to add a section (i.e., to survey schema 160 and/or survey instance 150). Pull down menu area 404 is used to display instances of section 102 to select a parent section where the new instance of section 102 is a subsection of another instance of section 102. Text field 406 may be used to enter a name (e.g., attribute 280) of the new instance of section 102. Check box 412 may be selected to specify whether an instance of insert 104 is associated with an instance of section 102. Pull down menus 408 may be used to display instances of insert 104 to identify types of inserts that are allowed. The save button 410 is used to save the new instance of section 102 in survey schema 160.

A new instance of question group 106 may be added, in one or more embodiments of the invention, using panel 422 of FIG. 4B. Pull down menu 424 displays instances of section 102 to select a section 102 that includes an instance of question group 106 as a member. Text field 426 may be used to enter a title for an instance of question group 106. Check box 430 identifies the instance of question group 422 as a reusable question group (i.e., set attribute 286 of question group 106). Save button 428 commits the new instance to survey schema 160 as an instance of question group 106.

Figure 5:
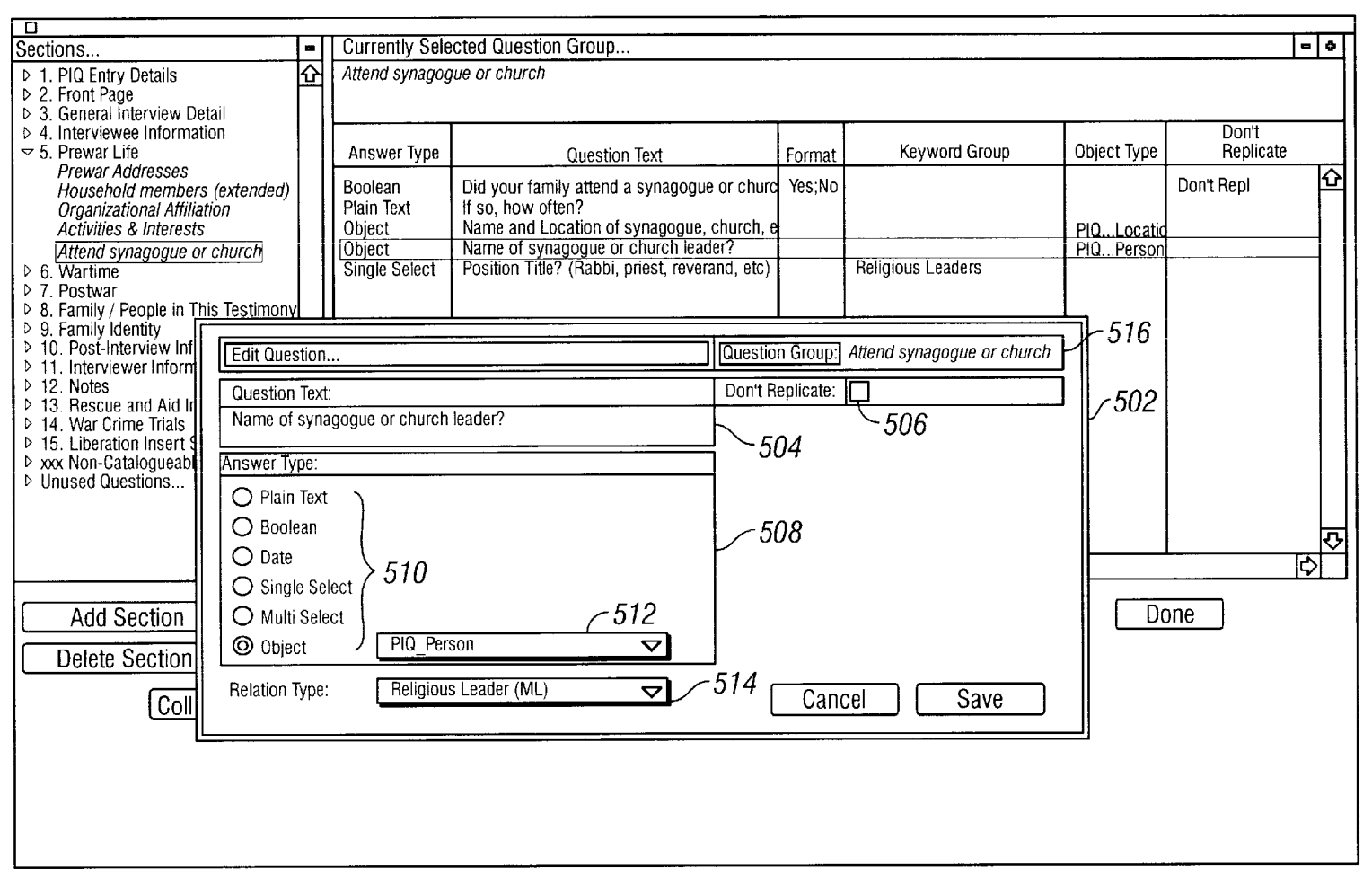

Instances of question 108 may be added, modified or deleted from survey schema 160 or a survey instance 150. FIG. 5 provides an example of a display (i.e., panel 502) that is used to edit an instance of question 108 according to an embodiment of the invention. Fields 516 and 504 identify the name associated with an instance of question group 106 and the text of the question associated with an instance of question 108, respectively. An answer type may be selected from answer type selections 510. Where the answer type is an object, pull down menu 512 may be used to display instances of object 122 for selection. Pull down menu 514 may be used to display instances of choice group 112 to associate answer choices to an instance of question 108.

Figure 6:
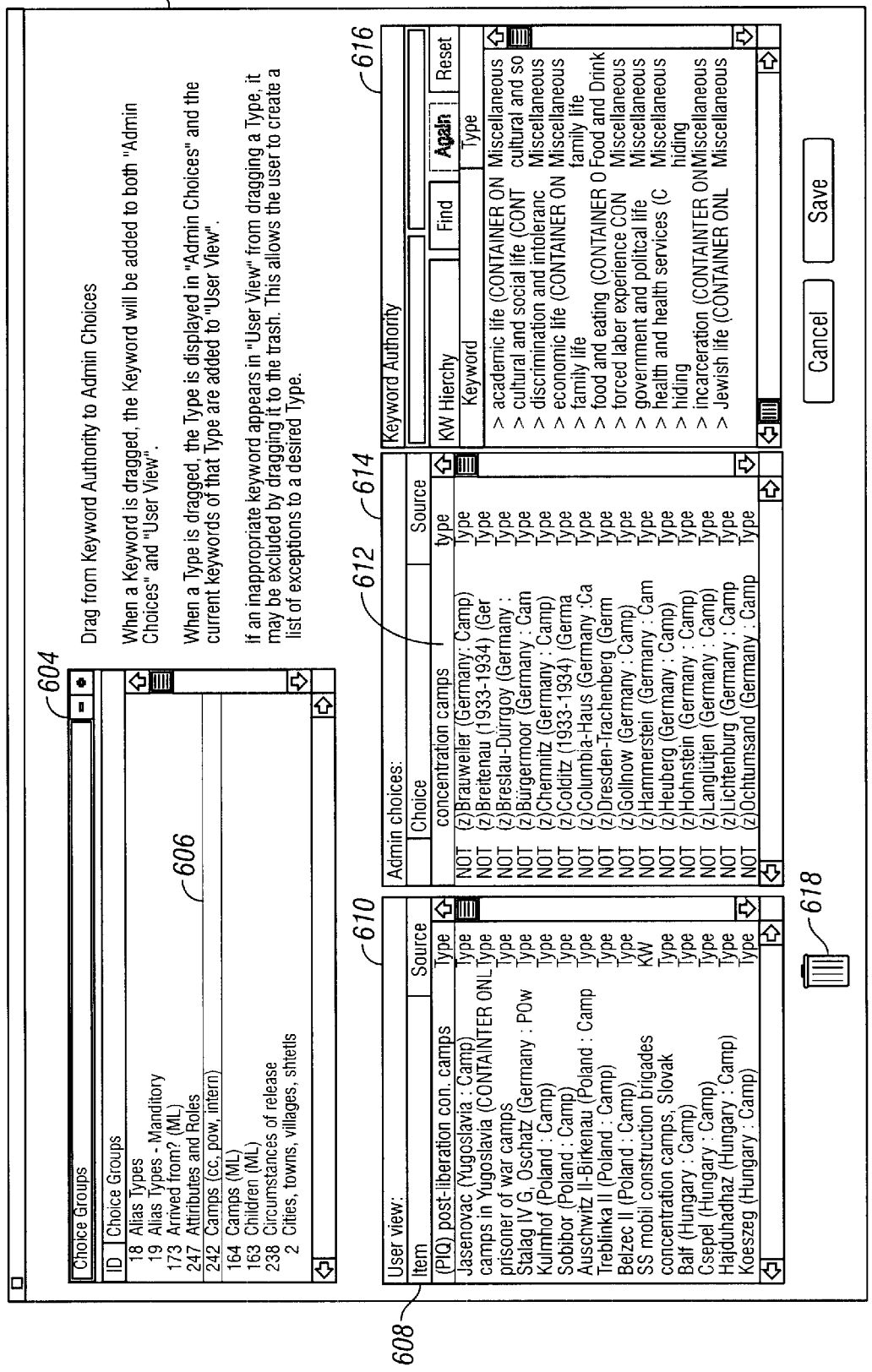
FIG. 6 illustrates a graphical user interface used to edit an instance of choice group according to one or more embodiments of the invention.

FIG. 6 illustrates a user interface used to edit an instance of choice group 112 according to one or more embodiments of the invention. Display 602 includes a listing, in panel 604, of instances of choice group 112. Selecting one of the entries in panel 604 causes information associated with the selected instance of choice group 112 to be displayed in panels 610 and 614. Panel 616 displays instances of type 118 and keyword 116 for selection.

Panel 610 identifies instances of choice item 114. A choice or class of choices may be dragged from panel 616 to panel 614. A choice (e.g., an instance of keyword 116) that is dragged from panel 616 to panel 614 is displayed in panels 614 and 610. A class of choices (e.g., type 118) is displayed in panel 614 and the choices within the class are displayed in panel 610. None or more of the choices within a class of choices may be excluded from the choices by dragging the choice from panel 610 to trash 618.

Entry 608 in panel 610 indicates that the instance of choice item 114 derives from a class of choices. Entry 612 of panel 614 identifies a class of choices (i.e., "concentration camps").

Figure 7:
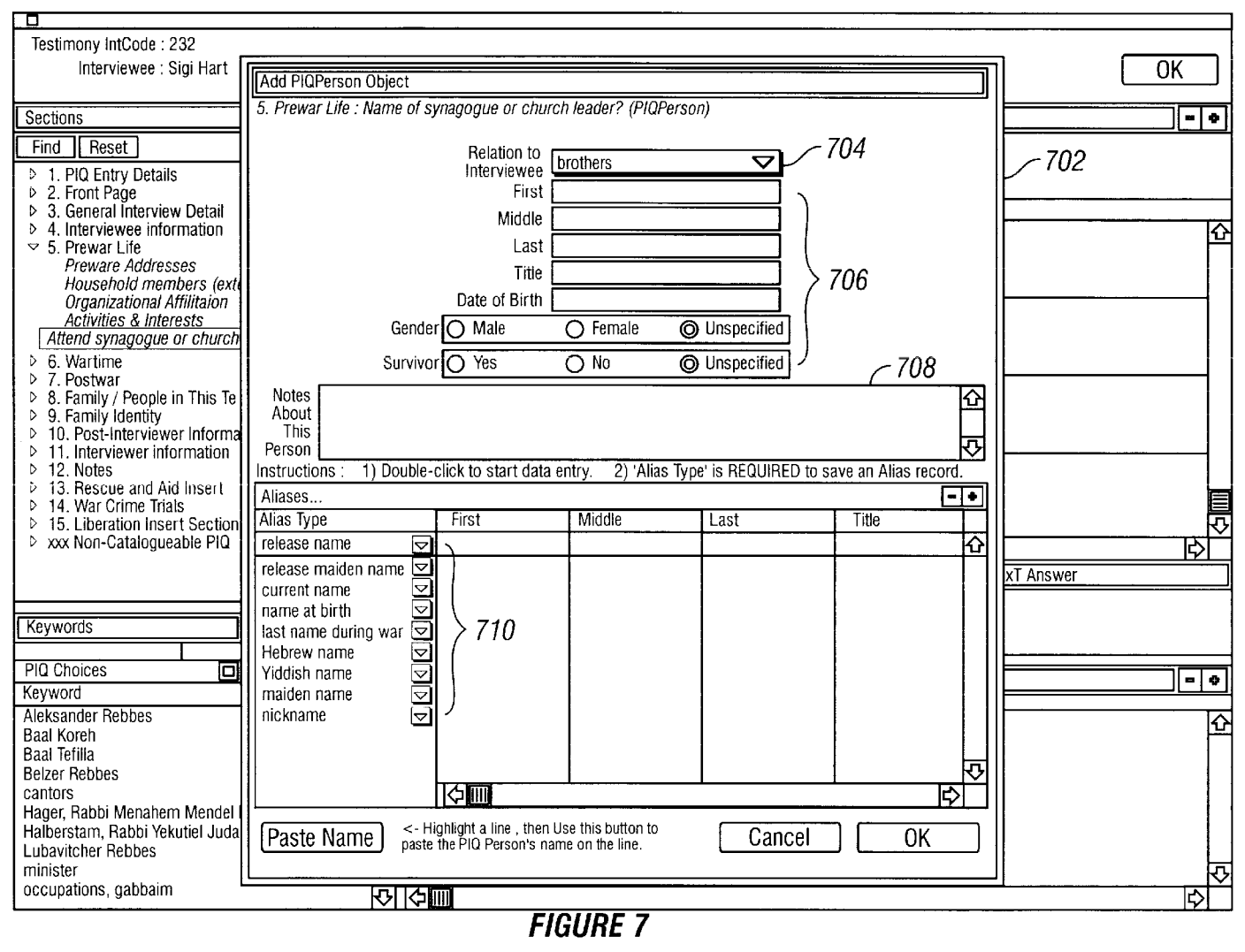
Figure 8:
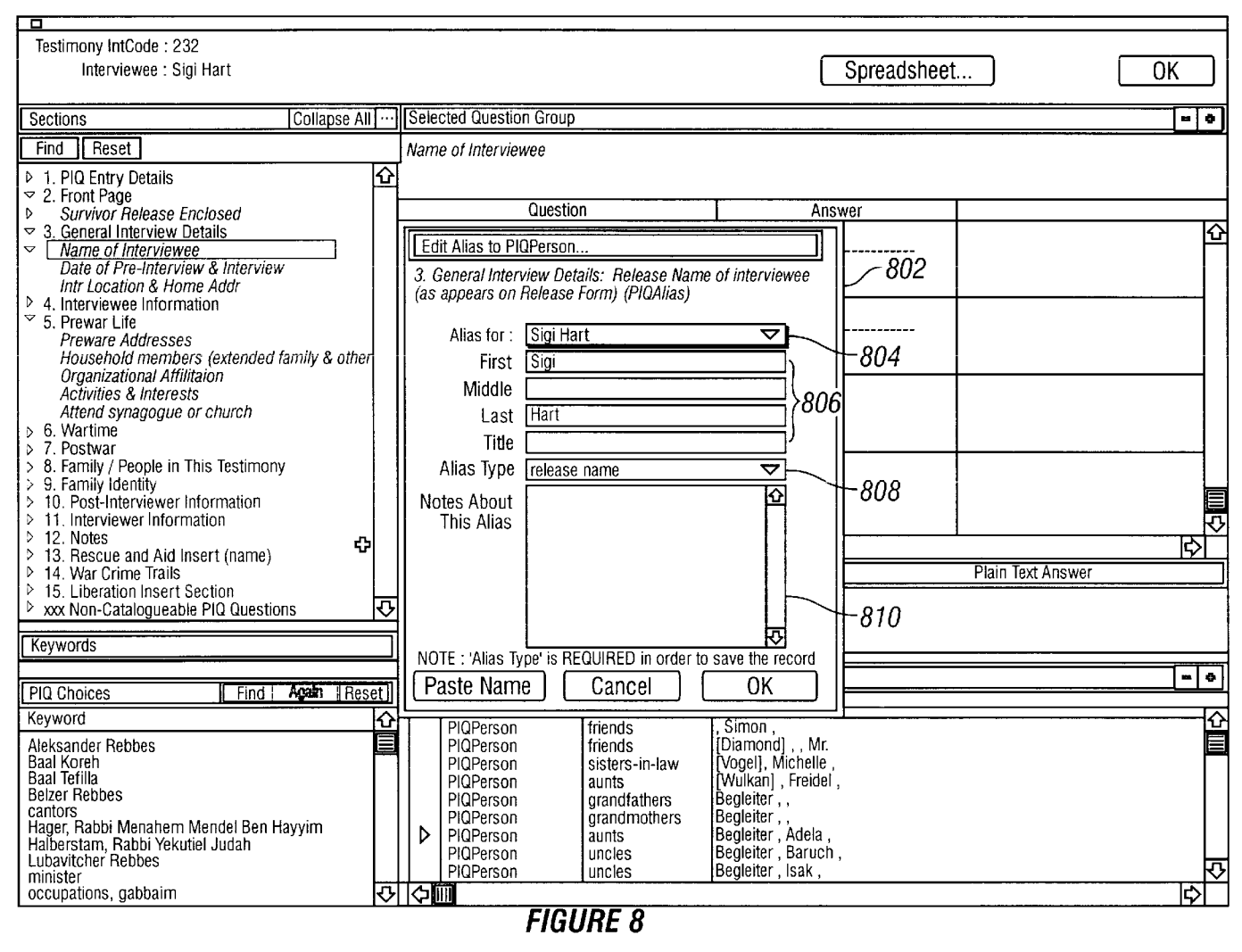
Figure 9:
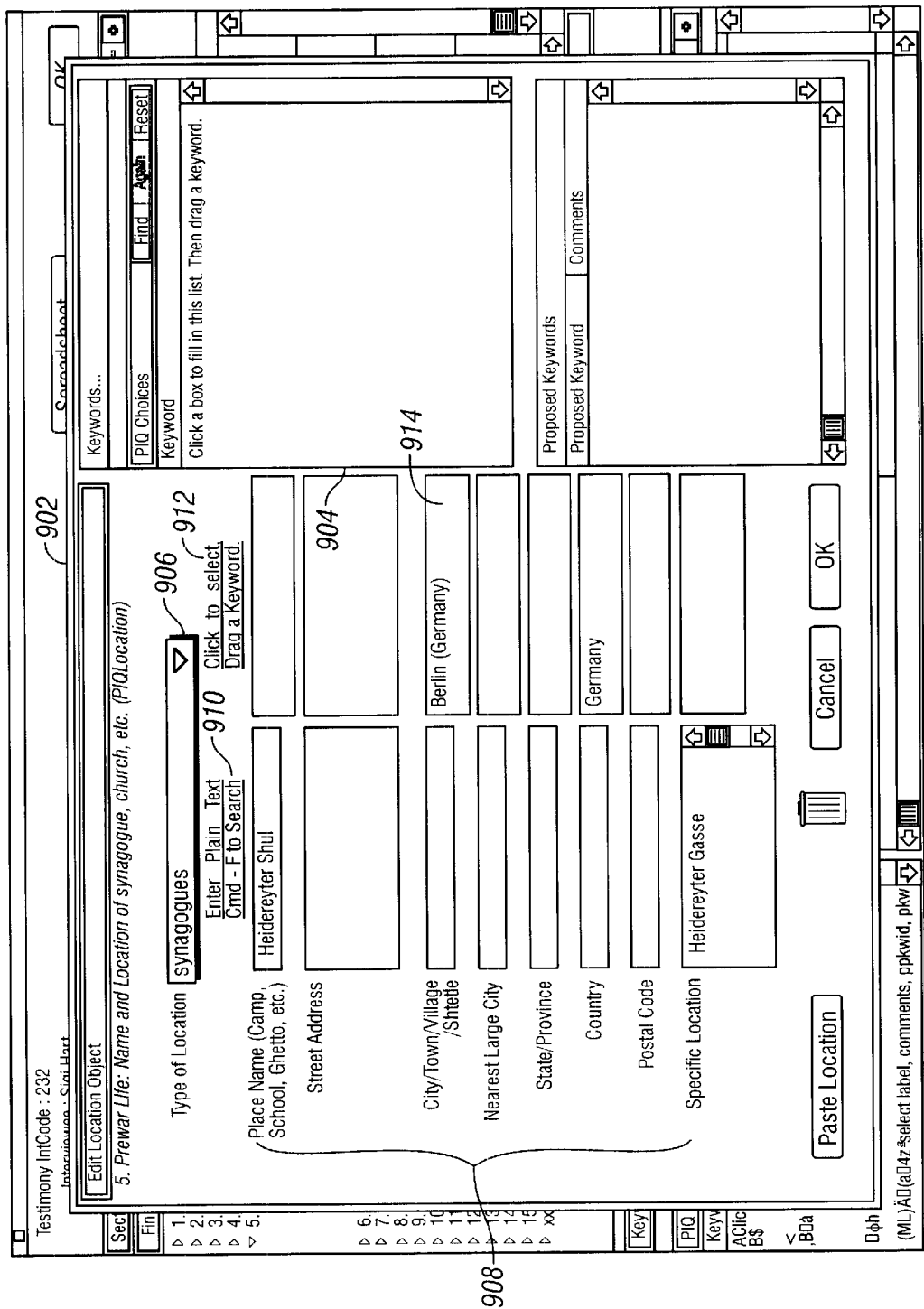

In one or more embodiments of the invention, an answer to a question may comprise a single answer or multiple answers. Answer 110 includes an attribute (e.g., attribute 266, "answertext") that may store a single answer such as a date, a boolean (e.g., "yes" or "no"), currency and text. Alternatively, answer 110 may contain a pointer to an instance of object 122 that comprises one or more attributes that contain the answer. Examples of object 122 include a person object, alias object and location object. FIGS. 7, 8 and 9 provide examples of a GUI for entering object information such as person, alias and location objects according to an embodiment of the invention.

Referring to FIG. 7, panel 702 may be used, in one or more embodiments of the invention, to enter information about a person. Pull down menu 704 is used to display and identify a relationship between the person surveyed and the person that is a part of the answer. Fields 706 are used to enter information related to the person answer. Text field 708 may be used to enter a note about the person. Pull down menus 710 may be used to identify an alias associated with the person answer (e.g., a name to which the person is also known).

FIG. 8 provides an example of a panel 802 that may be used to enter alias object information. Pull down menu 804 may be used to display and identify another survey element (e.g., person object) for which the alias object is an alias. Fields 806 identify the alias name, title, etc. Pull down menu 808 is used to display and select an alias type. Text field 810 may be used to input additional notes.

In an embodiment of the invention, if an answer to a question is a location, a location object is used. FIG. 9 provides a display of a panel 902 that may be used to specify a location answer according to one or more embodiments of the invention.

Pull down menu 906 is used to display and select a location type. Fields 908 are used to enter information associated with the attributes of a location object. Column 910 is used to receive a text entry. Column 912 may be used to display a selection made from class items associated with a given attribute. Panel 904 may be used to display choices for one of the fields in column 912 that has been selected. A choice is selected, in one or more embodiments of the invention, by dragging it from panel 904 to the selected field (e.g., field 914).

Embodiment of Computer Execution Environment (Hardware)

Figure 12:
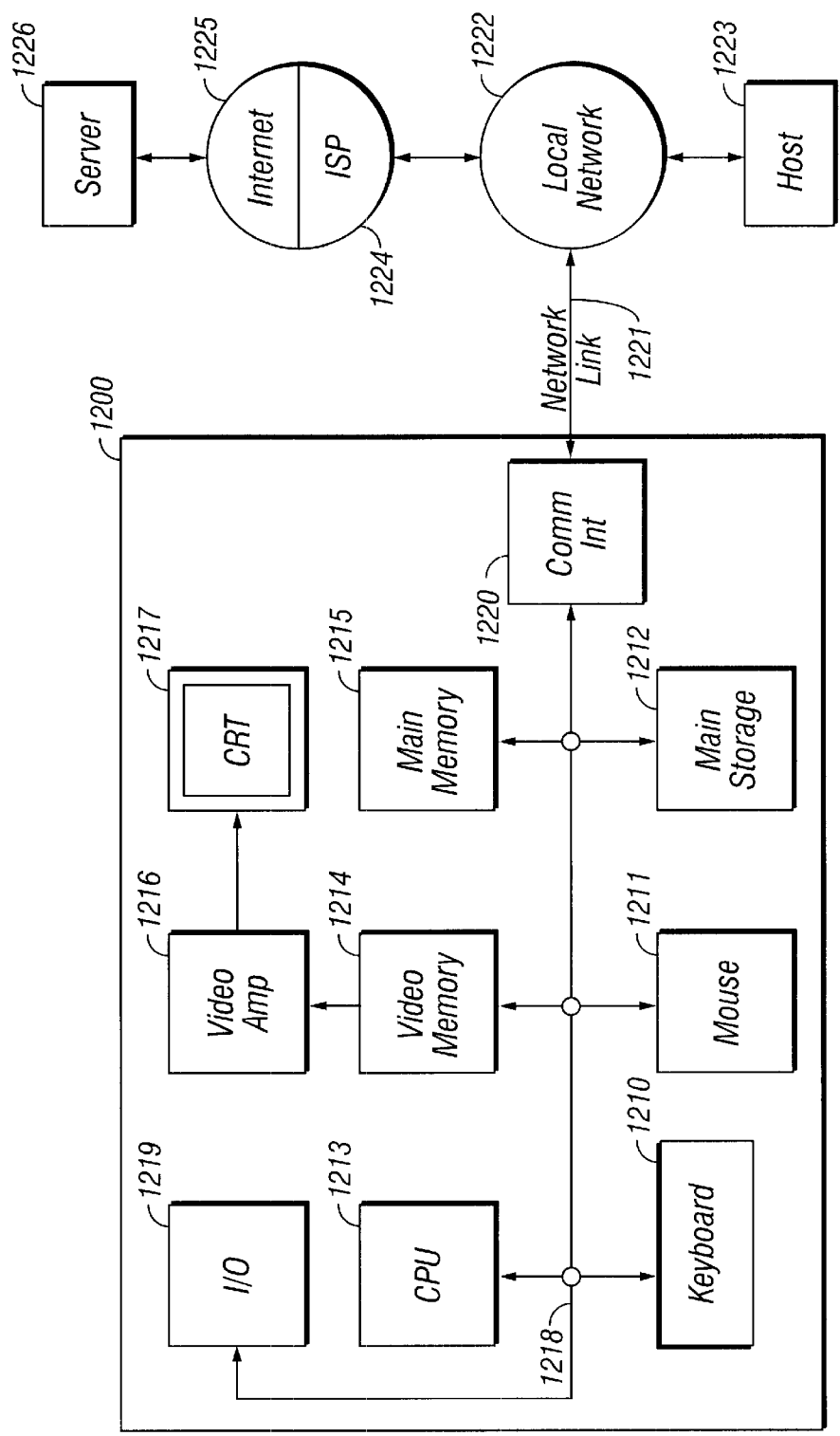
FIG. 12 is a block diagram of one embodiment of a computer system capable of providing a suitable execution environment for an embodiment of the invention.

An embodiment of the invention can be implemented as computer software in the form of computer readable code executed on a general purpose computer such as computer 1200 illustrated in FIG. 12, or in the form of bytecode class files executable within a Java runtime environment running on such a computer. A keyboard 1210 and mouse 1211 are coupled to a bi-directional system bus 1218. The keyboard and mouse are for introducing user input to the computer system and communicating that user input to processor 1213. Other suitable input devices may be used in addition to, or in place of, the mouse 1211 and keyboard 1210. I/O (input/output) unit 1219 coupled to bi-directional system bus 1218 represents such I/O elements as a printer, A/V (audio/video) I/O, etc.

Computer 1200 includes a video memory 1214, main memory 1215 and mass storage 1212, all coupled to bi-directional system bus 1218 along with keyboard 1210, mouse 1211 and processor 1213. The mass storage 1212 may include both fixed and removable media, such as magnetic, optical or magnetic optical storage systems or any other available mass storage technology. Bus 1218 may contain, for example, thirty-two address lines for addressing video memory 1214 or main memory 1215. The system bus 1218 also includes, for example, a 32-bit data bus for transferring data between and among the components, such as processor 1213, main memory 1215, video memory 1214 and mass storage 1212. Alternatively, multiplex data/address lines may be used instead of separate data and address lines.

In one embodiment of the invention, the processor 1213 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1215 is comprised of dynamic random access memory (DRAM). Video memory 1214 is a dual-ported video random access memory. One port of the video memory 1214 is coupled to video amplifier 1216. The video amplifier 1216 is used to drive the cathode ray tube (CRT) raster monitor 1217. Video amplifier 1216 is well known in the art and may be implemented by any suitable apparatus. This circuitry converts pixel data stored in video memory 1214 to a raster signal suitable for use by monitor 1217. Monitor 1217 is a type of monitor suitable for displaying graphic images. Alternatively, the video memory could be used to drive a flat panel or liquid crystal display (LCD), or any other suitable data presentation device.

Computer 1200 may also include a communication interface 1220 coupled to bus 1218. Communication interface 1220 provides a two-way data communication coupling via a network link 1221 to a local network 1222. For example, if communication interface 1220 is an integrated services digital network (ISDN) card or a modem, communication interface 1220 provides a data communication connection to the corresponding type of telephone line, which comprises part of network link 1221. If communication interface 1220 is a local area network (LAN) card, communication interface 1220 provides a data communication connection via network link 1221 to a compatible LAN. Communication interface 1220 could also be a cable modem or wireless interface. In any such implementation, communication interface 1220 sends and receives electrical, electromagnetic or optical signals which carry digital data streams representing various types of information.

Network link 1221 typically provides data communication through one or more networks to other data devices. For example, network link 1221 may provide a connection through local network 1222 to local server computer 1223 or to data equipment operated by an Internet Service Provider (ISP) 1224. ISP 1224 in turn provides data communication services through the world wide packet data communication network now commonly referred to as the "Internet" 1225. Local network 1222 and Internet 1225 both use electrical, electromagnetic or optical signals which carry digital data streams. The signals through the various networks and the signals on network link 1221 and through communication interface 1220, which carry the digital data to and from computer 1200, are exemplary forms of carrier waves transporting the information.

Computer 1200 can send messages and receive data, including program code, through the network(s), network link 1221, and communication interface 1220. In the Internet example, remote server computer 1226 might transmit a requested code for an application program through Internet 1225, ISP 1224, local network 1222 and communication interface 1220.

The received code may be executed by processor 1213 as it is received, and/or stored in mass storage 1212, or other non-volatile storage for later execution. In this manner, computer 1200 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, including embedded devices (e.g., web phones, etc.) and "thin" client processing environments (e.g., network computers (NC's), etc.) that support a virtual machine.

Thus, a survey system and method has been described in conjunction with one or more specific embodiments. The invention is defined by the claims and their full scope of equivalents.

What is claimed is:

1. In a computer system, a surveying method comprising:
obtaining a schema comprising a definition of elements, said schema usable in defining at least one survey and in retaining responses associated with said at least one survey;

obtaining a definition of said at least one survey comprising instances of said element definitions of said schema;

capturing said responses in attributes of instances of said schema.

2. The surveying method of claim 1 wherein said elements comprise a section, question group, question, and answer, said obtaining a definition of said at least one survey further comprising:

obtaining at least one instance of said section;

obtaining at least one instance of said question group associated with said at least one instance of said section;

obtaining at least one instance of a question associated with said at least one instance of a question group;

obtaining at least one instance of an answer associated with said question.

3. The surveying method of claim 1 wherein said elements comprises an insert, said insert capable of being repeated in said at least one survey.

4. The surveying method of claim 3 wherein said elements further comprise a question and an answer associated with said question, one instance of said answer being associated with one instance of said insert and a second instance of said answer being associated with a second instance of said insert.

5. The surveying method of claim 1 wherein said capturing responses further comprises storing a response in an attribute of an answer instance of said schema.

6. The surveying method of claim 1 wherein said capturing responses further comprises storing a response in at least one attribute of a data object associated with an answer element.

7. The surveying method of claim 1 wherein said obtaining a schema comprising a definition of elements further comprises:

defining, in said schema, at least one answer having a type designation;

creating a relationship between at least one question of said first element set and said at least one answer.

8. The surveying method of claim 7 wherein said obtaining a schema comprising a definition of elements further comprises:

defining at least one data object having at least one attribute capable of storing a response to said at least one question, said data object associated with said at least one answer.

9. A memory for storing survey information accessible by at least one computer program being executed on a machine, said survey information comprising:

a first set of elements stored in said memory, said first set of elements usable to define components of a survey;

a second set of elements stored in said memory, said second set of elements being associated with at least one of said first set of elements, said second set of elements storing survey responses.

10. The memory of claim 9 further comprising:

at least one survey instance comprising instances of said first set of elements.

11. The memory of claim 10 wherein said at least one survey instance further comprising instances of said second set of elements.

12. The memory of claim 9 wherein said structural elements further comprise:

at least one answer element, said at least one answer element identifying a type of said answer element, said answer element capable of storing a survey response in at least one attribute of said at least one answer element;

at least one question element, said at least one question element being associated with said at least one answer element, said at least one question element capable of storing a survey question;

at least one question group capable of grouping question elements;

at least one section capable of grouping question groups.

13. The memory of claim 12 wherein said type is a simple data type such that said survey response is retained in an attribute of said answer element.

14. The memory of claim 12 wherein said type is a complex data type, said type identifying a data element of said schema, said data element comprising at least one attribute capable of retaining said survey response.

15. The memory of claim 14 wherein said data element is a person object.

16. The memory of claim 14 wherein said data element is a location object.

17. The memory of claim 14 wherein said data element is an alias object.

18. In a computer system, a method comprising:

defining in a schema a plurality of questions and at least one answer, said at least one answer identifying an answer type;

associating each of said plurality of questions with one of said at least one answer;

defining a survey instance using said schema, said survey instance comprising at least one of said plurality of questions and said at least one answer.

19. The method of claim 18 further comprising:

defining in said schema at least one question group;

associating at least one of said plurality of questions with said at least one question group such that said at least one of said plurality of questions is a member of said question group.

20. The method of claim 18 further comprising:

defining in said schema at least one question group;

defining in said schema at least one section;

associating at least one of said plurality of questions with said at least one question group such that said at least one of said plurality of questions is a member of said question group.

21. The method of claim 20 further comprising:

associating at least one of said plurality of questions with said at least one question group.

22. The method of claim 18 further comprising:

defining in said schema at least one insert;

associating said at least one insert with at least one of said plurality of questions such that each of a multiplicity of responses to said at least one of said plurality of questions is a member of an instance of said at least one insert.

23. The method of claim 22 wherein said associating further comprises:

defining in said schema a section;

associating said at least one insert with said section;

associating said at least one of said plurality of questions with said section.

24. The method of claim 23 wherein said associating said at least one of said plurality of questions with said section further comprises:

defining in said schema at least one question group;

associating said at least one of said plurality of questions with said at least one question group such that said at least one of said plurality of questions is a member of said question group;

associating said at least one question group with said at least one section such that said at least one question group is a member of said at least one section.

25. A computer program product comprising:

a computer usable medium having computer readable program code embodied therein for surveying comprising:

computer readable program code configured to cause a computer to obtain a schema comprising a definition of elements, said schema usable in defining at least one survey and in retaining responses associated with said at least one survey;

computer readable program code configured to cause a computer to obtain a definition of said at least one survey comprising instances of said element definitions of said schema;

computer readable program code configured to cause a computer to capture said responses in attributes of instances of said schema.

26. The computer program product of claim 25 wherein said elements comprise a section, question group, question, and answer, said computer readable program code configured to cause a computer to obtain a definition of said at least one survey further comprising:

computer readable program code configured to cause a computer to obtain at least one instance of said section;

computer readable program code configured to cause a computer to obtain at least one instance of said question group associated with said at least one instance of said section;

computer readable program code configured to cause a computer to obtain at least one instance of a question associated with said at least one instance of a question group;

computer readable program code configured to cause a computer to obtain at least one instance of an answer associated with said question.

27. The computer program product of claim 25 wherein said elements comprises an insert, said insert capable of being repeated in said at least one survey.

28. The computer program product of claim 27 wherein said elements further comprise a question and an answer associated with said question, one instance of said answer being associated with one instance of said insert and a second instance of said answer being associated with a second instance of said insert.

29. The computer program product of claim 25 wherein said computer readable program code configured to cause a computer to capture responses further comprises:

computer readable program code configured to cause a computer to store a response in an attribute of an answer instance of said schema.

30. The computer program product of claim 25 wherein said computer readable program code configured to cause a computer to capture responses further comprises:

computer readable program code configured to cause a computer to store a response in at least one attribute of a data object associated with an answer element.

31. The computer program product of claim 25 wherein said computer readable program code configured to cause a computer to obtain a schema comprising a definition of elements further comprises:

computer readable program code configured to cause a computer to define, in said schema, at least one answer having a type designation;

computer readable program code configured to cause a computer to create a relationship between at least one question of said first element set and said at least one answer.

32. The computer program product of claim 31 wherein said computer readable program code configured to cause a computer to obtain a schema comprising a definition of elements further comprises:

computer readable program code configured to cause a computer to define at least one data object having at least one attribute capable of storing a response to said at least one question, said data object associated with said at least one answer.

33. A computer program product comprising:

a computer usable medium having computer readable program code embodied therein for surveying comprising:

computer readable program code configured to cause a computer to define in a schema a plurality of questions and at least one answer, said at least one answer identifying an answer type;

computer readable program code configured to cause a computer to associate each of said plurality of questions with one of said at least one answer;

computer readable program code configured to cause a computer to define a survey instance using said schema, said survey instance comprising at least one of said plurality of questions and said at least one answer.

34. The computer program product of claim 33 further comprising:

computer readable program code configured to cause a computer to define in said schema at least one question group;

computer readable program code configured to cause a computer to associate at least one of said plurality of questions with said at least one question group such that said at least one of said plurality of questions is a member of said question group.

35. The computer program product of claim 33 further comprising:

computer readable program code configured to cause a computer to define in said schema at least one question group;

computer readable program code configured to cause a computer to define in said schema at least one section;

computer readable program code configured to cause a computer to associate at least one of said plurality of questions with said at least one question group such that said at least one of said plurality of questions is a member of said question group.

36. The computer program product of claim 35 further comprising:

computer readable program code configured to cause a computer to associate at least one of said plurality of questions with said at least one question group.

37. The computer program product of claim 33 further comprising:

computer readable program code configured to cause a computer to define in said schema at least one insert;

computer readable program code configured to cause a computer to associate said at least one insert with at least one of said plurality of questions such that each of a multiplicity of responses to said at least one of said plurality of questions is a member of an instance of said at least one insert.

38. The computer program product of claim 37 wherein said computer readable program code configured to cause a computer to associate further comprises:
   computer readable program code configured to cause a computer to define in said schema a section;
   computer readable program code configured to cause a computer to associate said at least one insert with said section;
   computer readable program code configured to cause a computer to associate said at least one of said plurality of questions with said section.

39. The computer program product of claim 38 wherein said computer readable program code configured to cause a computer to associate said at least one of said plurality of questions with a section further comprises:
   computer readable program code configured to cause a computer to define in said schema at least one question group;
   computer readable program code configured to cause a computer to associate said at least one of said plurality of questions with said at least one question group such that said at least one of said plurality of questions is a member of said question group;
   computer readable program code configured to cause a computer to associate said at least one question group with said at least one section such that said at least one question group is a member of said at least one section.

* * * * *